(No Model.) 2 Sheets—Sheet 1.
G. W. BOND.
DOWELING MACHINE.
No. 529,697. Patented Nov. 27, 1894.
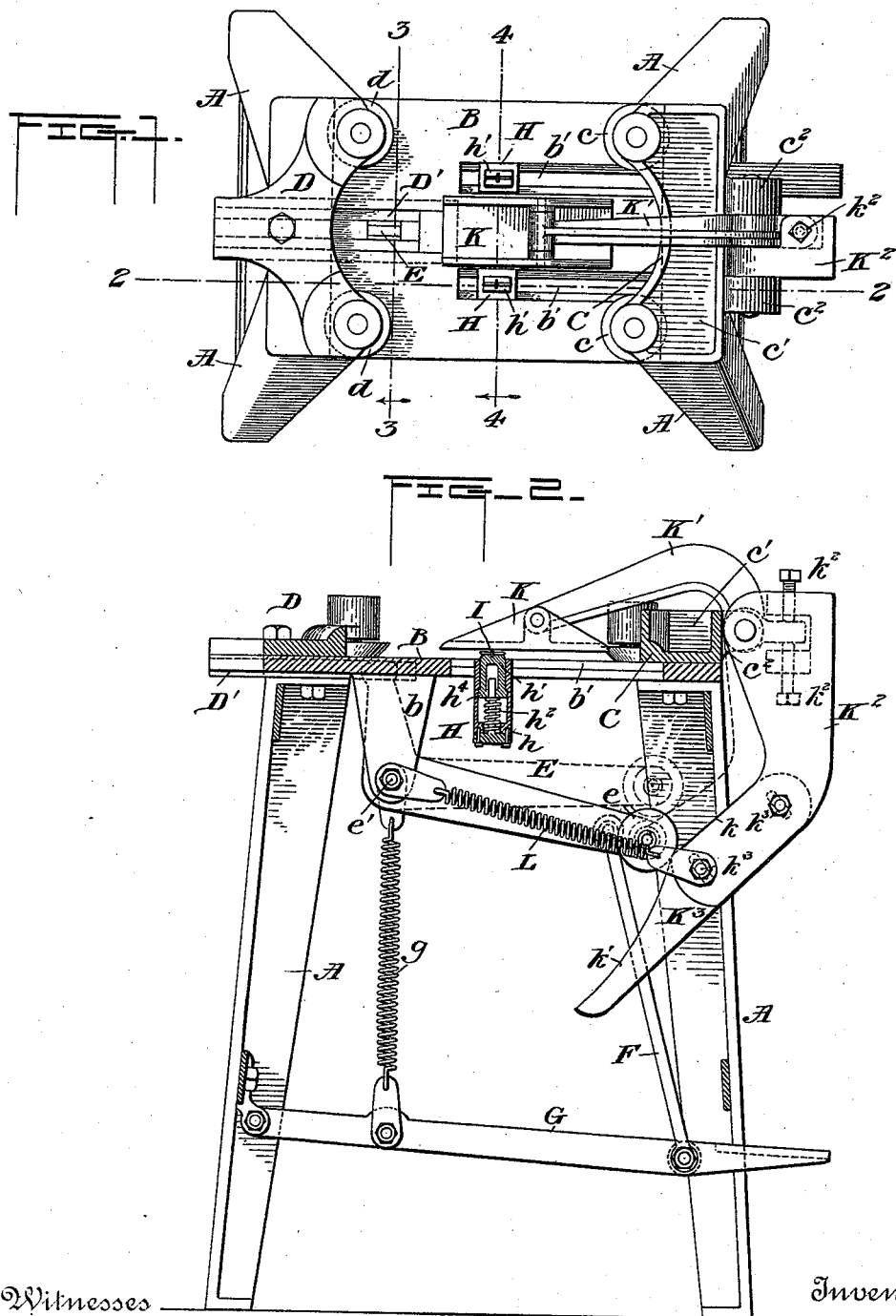
Witnesses
Inventor
George W. Bond,
By his Attorney (No Model.) 2 Sheets—Sheet 2.

G. W. BOND.
DOWELING MACHINE.

No. 529,697. Patented Nov. 27, 1894.

Witnesses
Inventor
George W. Bond
Attorney

UNITED STATES PATENT OFFICE.

GEORGE W. BOND, OF RAYNHAM, MASSACHUSETTS.

DOWELING-MACHINE.

SPECIFICATION forming part of Letters Patent No. 529,697, dated November 27, 1894.

Application filed March 8, 1894. Serial No. 502,896. (No model.)

*To all whom it may concern:*

Be it known that I, GEORGE W. BOND, a citizen of the United States, residing at Raynham, in the county of Bristol and State of Massachusetts, have invented certain new and useful Improvements in Doweling-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to doweling machines, whereby two or more pieces of material are united by dowels or by double pointed nails.

My machine is especially intended for putting together the pieces composing the heads of barrels and kegs, but it is equally well adapted to the doweling of any other articles.

The machine consists in brief of a fixed abutment or rest, a movable head or driver, one or more loose dowel carriers, a pressure plate for keeping the work in place, and means for operating the driver and pressure plate. The dowels are laid upon their carriers, and the pieces to be united are placed on each side of them, one lying against the rest, and the other against the driver, which is then moved toward the rest, forcing the two pieces of wood against the ends of the dowel, which is thus caught between them and embedded in them as they are brought together.

Figure 3:
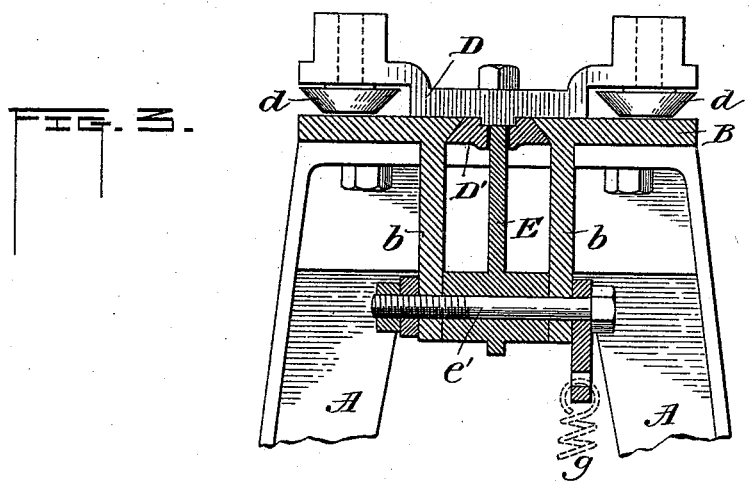
Figure 4:
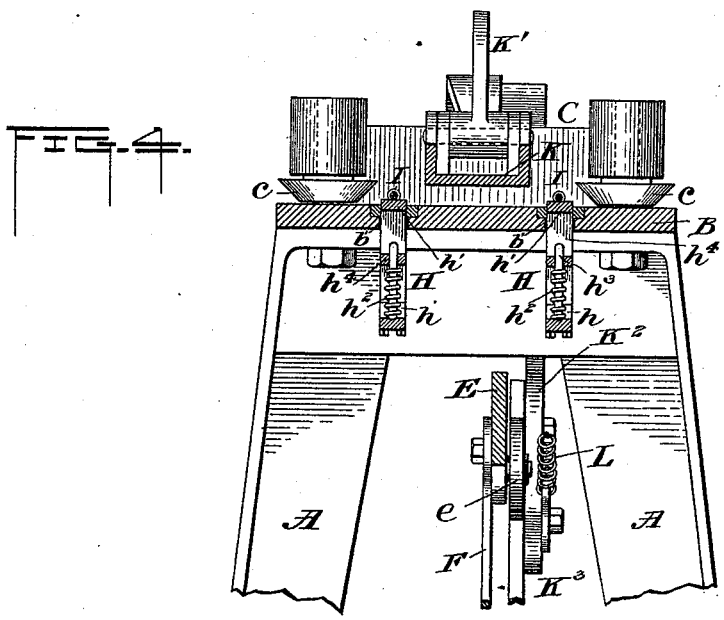
Figure 5:
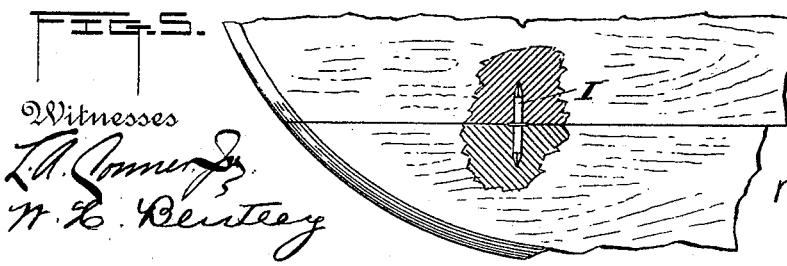

In the drawings, Figure 1 is a top plan view of a machine embodying my invention. Fig. 2 is a vertical section on line 2—2 Fig. 1. Fig. 3 is a vertical cross section on line 3—3 Fig. 1. Fig. 4 is a cross section on line 4—4 Fig. 1, and Fig. 5 shows the portions of a barrel head doweled together.

The frame of the machine is simply four strong legs A and a top or table B. At one end of the top is a fixed abutment or rest C, whose working face is preferably concave, to accommodate it to the edge of pieces of barrel heads. It may however be straight, as indicated by the dotted lines, when straight edged goods are being operated upon. The projecting corners of the rest are provided with horizontal friction wheels $c$ having preferably beveled edges as shown to fit the chamfer on the edge of a barrel head, and so avoid bruising it. The rest C has a cavity $c'$ to serve as a box for nails or dowels.

The removable head or driver D is similar in shape to the rest C, and is provided with similar anti-friction wheels $d$. It rests on the table B and is fastened to a slide D', which runs in an undercut slot in the table. A hole in the slide receives one end of a lever E fulcrumed in suitable hangers $b$ on the under side of the table and connected by a link F with the treadle G. A spring $g$ keeps the treadle normally raised and the driver D drawn back.

In the table B are one or more slots $b'$, parallel with the line of movement of the driver D. I prefer to have two of these slots, which are rabbeted or otherwise shaped to form ledges on which slide the loose dowel carriers H. Each carrier consists of a frame $h$ supported on the ledges and carrying a vertically yielding head $h'$ whose upper end rises slightly above the frame and has its front and rear edges beveled or rounded off. The upper surface of the head is suitably shaped to receive a dowel, preferably a double ended nail I, such as is shown more clearly in Fig. 5, the length of the head being preferably the same as that of the nail, as shown. The head may be yieldingly supported in its frame by means of a helical spring $h^2$ resting on a lower removable portion of the frame and pressing up against the lower end of the head, which is guided on pin $h^3$ and has shoulders $h^4$ to abut against the shoulders on the frame to limit its upward movement, and cause it to hold the dowel at the right height.

In order to prevent the pieces of wood from doubling up when pressed together, a pressure plate is provided. This is preferably a flat plate K hinged to the end of a lever K' which is fulcrumed in ears $c^2$, on the back of the fixed abutment C, or on the table B. The tail of the lever is bent under the table, where it forms a cam surface $k\,k'$ along which travels the end of the lever E, which is preferably provided with a roller $e$, and serves to actuate the lever and bring down the plate whenever the treadle G is depressed. The lever is preferably made in three parts K', K², K³, the first two being fulcrumed side by side in the ears c², one part carrying adjusting screws k² engaging with a lug on the other part and permitting the angular variation of the two parts K' K² and the consequent pressure upon the work. The relative angular position of the parts K² K³ can also be adjusted by the bolts k³, so that the curve k' may be set to be concentric with the axis e' of the lever E when the end of said lever passes along said curve. The spring L raises the pressure plate K when the treadle G rises.

The operation of my machine is as follows: The dowels or double ended nails are laid upon the carriers, and on each side of them are placed the pieces which are to be doweled together, for instance two boards. The treadle is then depressed, the first movement of the lever E from the dotted line position to the full line position in Fig. 2, causing the roller e to travel along the surface k and forcing the lever K² to the position shown in Fig. 2, thereby bringing the pressure plate down upon the work. Meanwhile the driver head pushes the boards up to the nail carriers and their edges have thus become parallel. The continued movement of the lever E does not further affect the pressure plate because the surface k' is concentric with the path of the roller e, and thus the roller merely locks the pressure plate in position while passing along this surface k'; but during this part of its movement, the lever E forces the boards toward each other, causing their adjacent edges to catch the ends of the dowels. The continued approach of the boards compels the heads h' to yield downwardly by reason of the boards riding over their rounded edges, leaving the dowels held between the boards, into which they are finally forced completely by the meeting of the edges of the boards under the continued pressure of the driver. The loosely mounted carriers H slide readily to and fro to suit the varying width of the pieces to be united, and the friction wheels permit the pieces to readily adjust themselves so as to insure a parallelism of their meeting edges.

It is evident that by using two or more nail carriers in each slot b', three or more pieces can be doweled together simultaneously. It is also evident that the machine may be driven by power instead of a foot treadle, if desired.

Having thus described my invention, what I claim, and desire to secure by Letters Patent, is—

1. A doweling machine, comprising means for forcing together the pieces to be united, and one or more dowel carriers loosely mounted, whereby said carriers are free to adjust themselves to the proper position between the pieces when the latter are forced together, substantially as described.

2. A doweling machine, comprising a table having one or more longitudinal slots, dowel carriers loosely mounted in said slots, and means for forcing together the pieces to be united, in a line parallel with said slots, substantially as described.

3. In a doweling machine, the combination with means for forcing together the pieces to be united, of a dowel carrier consisting of a vertically yielding head to support the dowel, said head having beveled or rounded edges to be engaged by said pieces, which thereby automatically force the carrier down out of their way; substantially as described.

4. In a doweling machine, the combination with means for forcing together the pieces to be united of a dowel carrier consisting of a frame h, a head h', a spring h² supporting said head, and interoperating shoulders on the frame and head to limit the upward movement of said head, substantially as described.

5. In a doweling machine, the combination with the table having a longitudinal slot provided with ledges, of a dowel carrier loosely supported on said ledges, and provided with a vertically yielding head, substantially as described.

6. In a doweling machine the combination with one or both of the elements for forcing the pieces together, of beveled anti-friction wheels, substantially as described.

7. In a doweling machine, the combination with means for forcing together the parts to be united, of a lever fulcrumed near the plane of the pieces and composed of two or more parts angularly adjustable, a pressure plate hinged to the lever, and movable thereby transverse to the motion of the pieces, and a single operating lever having one end engaged with the forcing device and the other end adapted to engage with the pressure plate lever, substantially as described.

8. In a doweling machine, the combination with a reciprocating driver D, of a lever E for actuating the same, a pressure plate K, a lever carrying said plate, composed of the parts K', K², K³, the latter part having the cam surfaces K, K' with which the end of the lever E engages, and means for actuating the lever E; substantially as described.

In testimony whereof I affix my signature in presence of two witnesses.

GEORGE W. BOND.

Witnesses:
ARBA N. LINCOLN,
CHARLES L. FOOTE.